Aug. 20, 1957     T. H. LITTLE     2,803,425

BRAKE CONTROL VALVE MECHANISM

Filed Nov. 23, 1954

Inventor
Thomas H. Little
By Carlson, Pitzner, Hubbard & Wolfe
Atty's

United States Patent Office 2,803,425
Patented Aug. 20, 1957

2,803,425

BRAKE CONTROL VALVE MECHANISM

Thomas H. Little, Duluth, Minn., assignor to Multi-Products, Inc., Duluth, Minn., a corporation of Minnesota Application November 23, 1954, Serial No. 470,656

3 Claims. (Cl. 251—257)

The invention relates to hydraulic systems and more particularly to an improved valve for controlling fluid flow in such systems.

One object of the invention is to provide a valve adapted to be selectively set to permit free flow of fluid therethrough either in one direction only or in both directions, which valve is simple and rugged in construction, whose operation is substantially unaffected by wear of the moving parts, and which accordingly remains free of leakage over long periods of use.

The improved valve is particularly well adapted for use in hydraulic systems of the type employed in automotive vehicles as service brake systems and when incorporated in such a system enables it to be conditioned for operation either in the conventional manner or to provide for automatically locking the brakes against release after they have been engaged by operation of the usual brake pedal.

Still another object is to provide a valve of the above general type which is inherently balanced regardless of the fluid pressure in the system, which is quick and positive in action and which is substantially free of leakage and thus safe to use in a vehicle braking system.

Other objects and advantages will become apparent from the following detailed description of the preferred embodiment illustrated in the accompanying drawings, in which.

Figure 1:
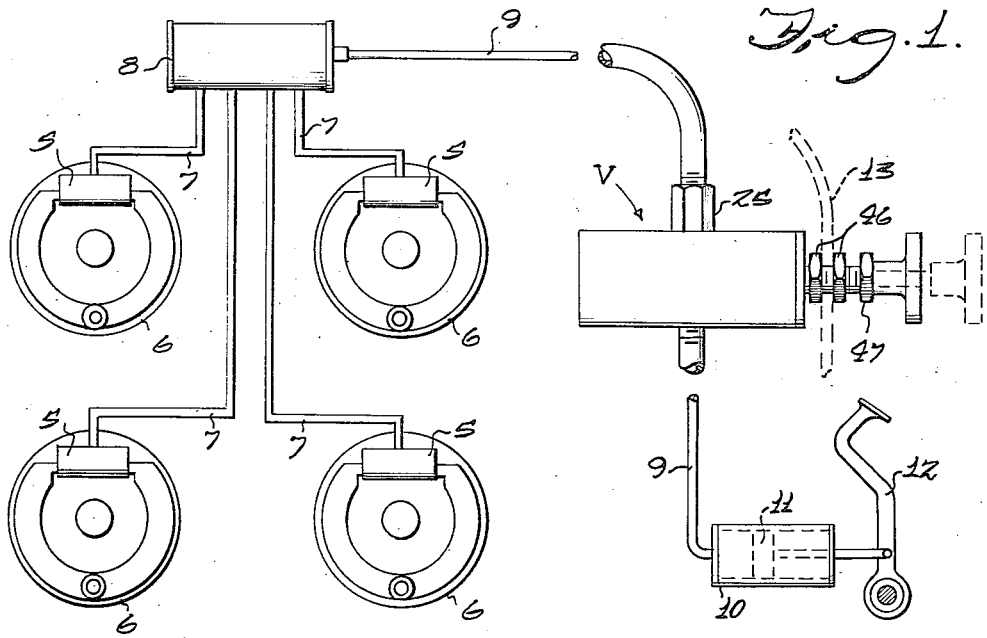
Figure 1 is a diagrammatic view of a vehicle hydraulic brake system equipped with a control valve embodying the features of the invention.

While I have shown and will describe herein a preferred form of the valve and its application to a hydraulic brake system, it is to be understood that there is no intention to limit the invention to that particular use of the valve, nor to the specific structure shown by way of illustration. In particular, references hereinafter to hydraulic brake systems are to be understood to embrace comparable hydraulic systems and the intention is to cover all modifications and adaptations falling within the spirit and scope of the invention as expressed in the appended claims.

By way of illustration, a valve V constructed in accordance with the invention is shown (Fig. 1) connected in a hydraulic brake system of the type commonly employed as a service brake in automotive vehicles. The brake system includes a plurality of brake actuating devices 5, one for each of the wheel brakes 6, of which there are four in the exemplary embodiment. The actuating devices are connected by individual conduits 7 with a manifold 8 which connects those conduits to a main brake line 9 which normally leads to a master brake cylinder 10. A piston 11 reciprocable in the cylinder 10 by a foot pedal 12 is operative upon depression of the pedal to force fluid under pressure to the actuating devices to engage or set the brakes 6. Upon release of the pedal, the brakes are disengaged by springs or the like incorporated therein and the fluid is expelled from the actuating devices and returned to the master cylinder 10.

In systems of the above type, the valve V is adapted to be interposed in the main brake line 9 between the master cylinder 10 and the manifold 8, to control the flow of fluid from the actuating devices to the master cylinder. The valve of course is mounted within easy reach of the driver of the vehicle, for example, on the vehicle dashboard 13.

Figure 2:
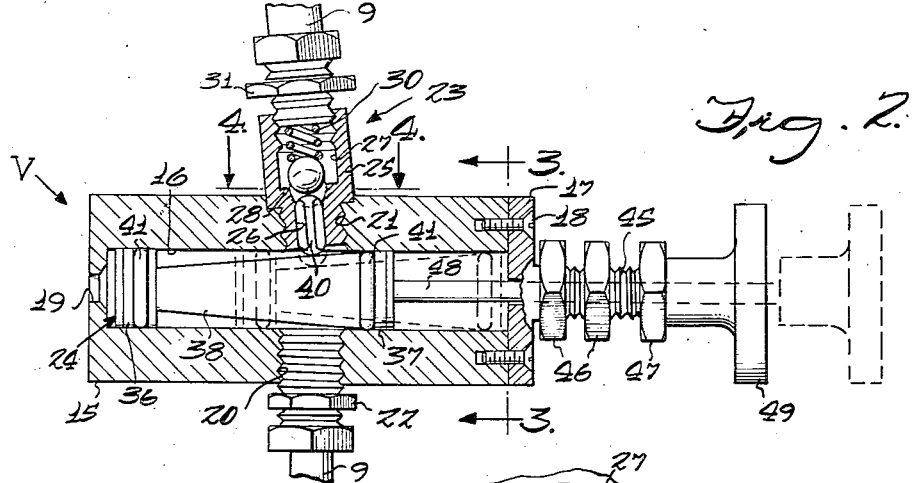
Fig. 2 is a longitudinal sectional view of the valve taken in a vertical plane.
Figures 3, 4:
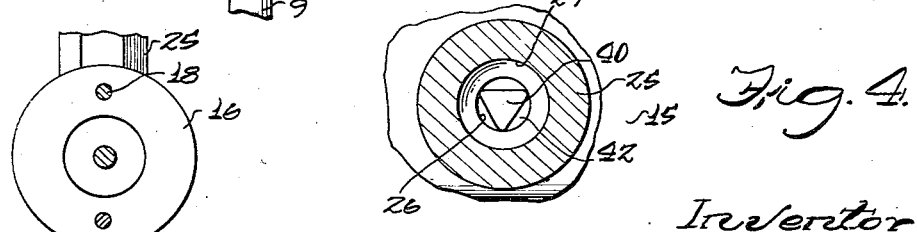
Fig. 3 is a transverse sectional view of the valve taken in a vertical plane substantially on the line 3—3 of Fig. 2.
Fig. 4 is a fragmentary sectional view taken in a horizontal plane substantially on the line 4—4 of Fig. 2.

In its preferred form as shown in Figs. 2–4, the valve V comprises a housing 15 having a central bore defining an elongated cylindrical chamber 16. For convenience of assembly, the chamber opens at full diameter at one end of the housing and such end is fitted with an end cap 17 rigidly attached to the housing as by screws 18. The other end of the chamber 16 is vented, preferably by a relatively small hole 19 in the other end of the housing.

For connection in a hydraulic brake system, the casing 15 is formed with two passages or ports 20 and 21 opening into opposite sides of the chamber 16 substantially midway of its ends. As shown in Fig. 2, the port 20 is threaded for the reception of a conventional fitting 22 by which the section of the brake line 9 leading from the master cylinder is connected to the valve chamber.

The other port 21 is adapted to be connected through a check valve 23 to the section of the brake line 9 leading to the manifold 8. The check valve may be of any preferred construction and, in accordance with the invention, is mounted on the casing 15 along with actuating mechanism, including a plunger 24 reciprocal in the chamber 16 by which the valve may be conditioned to prevent fluid flow in one direction through the valve or to disable it and thus permit fluid flow in both directions. In the embodiment illustrated, the valve 23 comprises a casing in the form of a bushing 25 having an end portion of reduced diameter threaded into the port 21. The bushing is formed with a stepped bore comprising a small diameter portion of substantial length which defines a passage 26 communicating with the chamber 16. The passage 26 opens into the large diameter portion 27 of the bore which is formed to define a flat valve seat 28 around the end of the passage.

Fluid flow through the passage in one direction is controlled by a movable valve member 29, herein shown as a ball, adapted to cooperate with the seat 28. Preferably, the valve member is yieldably urged against the seat or to a closed position by a spring 30 interposed between the member and a fitting 31 threaded into the open end of the bore. The fitting serves to connect the other section of the brake line 9 to the valve. It will be evident that when so connected, valve 23 will, at all times, permit flow of fluid from the master cylinder 10 to the brake actuators 5 to engage or set the brakes. When the valve member is seated, however, return flow of fluid from the actuators to the master cylinder is blocked and consequently the brakes remain locked.

Provision is made whereby the driver of the vehicle may open the relief valve 23 to release the brakes after they have been locked, or may render the valve 23 inoperative so that the brakes may be engaged and released in the conventional manner by manipulation of the foot pedal 12. For this purpose, the plunger 24 is shifted axially of the chamber 16 between two operated positions. While the exemplary valve contemplates manual shifting of the plunger 24, it will be appreciated that the shifting may be effected by remotely controlled power means such, for example, as a solenoid. As shown, the plunger is formed with two axially spaced cylindrical lands 36 and 37 dimensioned for sealing engagement with the walls of the chamber 16. The section 38 of the plunger between the lands is reduced in diameter and, in this instance, tapered throughout its length for cooperation with a valve actuating element 40. The lands 36 and 37, together with the reduced section 38 of the plunger, define a passage affording communication between the ports 20 and 21 in all positions of the plunger. Leakage of fluid from this passage is effectively prevented by O-rings 41 or comparable sealing elements provided on the lands.

In the operation of the valve mechanism, the tapered section 38 of the plunger 24 acts as a cam to shift the actuating element 40 in a direction to force the valve member 29 off its seat or to permit movement of the valve member to closed position under the urging of its spring 30. To minimize friction and to reduce bending stresses on the actuating member, the aperture 21 is inclined so that the axis of the passage 26 and consequently that of the member is perpendicular to the tapered surface of the plunger section.

The actuating element 40 in its preferred form is supported and guided in the passage 25 for endwise sliding movement and its lower end is rounded or otherwise suitably shaped to ride on the tapered surface of the plunger section 38 as the plunger reciprocates. To carry out its functions, the element is dimensioned lengthwise so that when it rides up on the larger diameter portion of the plunger section, valve 29 is lifted from its seat thus opening the valve 23 for the flow of fluid in either direction through the valve. When the element 40 rides on the smaller diameter of the plunger section, spring 30 acts to seat the valve 29 and thus close the valve for fluid flow in one direction. The spring 30 yields, of course, to permit flow in the opposite direction.

The valve actuating element 40 is shaped to provide a close sliding fit with the walls of the passage 26 without interfering with flow of fluid through the passage. As shown, in Fig. 4, the element is generally triangular in cross-section, thus defining with the passage walls a series of smaller passages 42 for fluid flow. It will be understood, of course, that the parts are dimensioned so that the effective areas of the small passage 42 are sufficiently large to accommodate maximum fluid flow required in the brake system.

Provision is made for mounting the valve mechanism V on a part of the vehicle where it is within easy reach of the driver, on the dashboard or instrument panel 13. Such panels are usually constructed of sheet metal. For such mounting, the cover plate 17 of the valve is formed with an extension or neck 45 dimensioned to extend through an aperture in the panel 13. Clamping nuts 46 threaded on the neck on opposite sides of the panel serve to clamp the valve in place. A third nut 47 threaded on the end of the neck provides an adjustable stop for determining one limit position of the plunger.

For convenient manual operation, the plunger 24 is provided with a rigid stem 48 adapted to extend through the cover plate 18 and through an axial bore of the neck 45. A suitable kob or button 49 is provided on the end of the stem for manual manipulation.

The operation of the improved brake locking valve, when connected into the braking system as shown in Fig. 1, will be readily apparent. When it is desired to operate the brakes in the conventional manner by manipulation of the foot pedal 12, the knob 49 is pushed inwardly to position the plunger 24 as shown in Fig. 2. In this position, the tapered portion 38 of the plunger acting through the element 40 lifts the check valve member 29 from its seat so that fluid may pass freely from the master cylinder to the brake actuators and return freely.

When it is desired to lock the brakes as for parking, or when the vehicle is to be started on an incline, the knob 49 is pulled out to bring the smaller portion of the plunger 38 for engagement by the element 40. The check valve element 39 is thus seated in the valve and return flow of fluid from the brake actuators to the master cylinder is positively blocked. The brakes may be energized, however, since the check valve 23 permits flow of fluid from the master cylinder to the actuators. The brakes may be released at any time by simply pushing in the knob 49. This simple mode of operation is particularly advantageous in the handling of heavy vehicles, such as trucks. When starting such a vehicle on an incline, for example, a quick push on the knob 49 as the clutch is engaged will release the brakes and enable the engine to pick up the drive without permitting the vehicle to roll back.

It will be apparent that the invention provides a brake locking valve of novel and improved construction. The valve is simple and rugged in construction and the parts which serve to retain the brake fluid within the system are subject to a minimum of wear. The valve is thus substantially leakproof and thus entirely safe to use in a vehicle braking system.

I claim as my invention:

1. A valve comprising, in combination, a housing defining a cylindrical chamber with a pair of passages opening radially of the chamber, a plunger reciprocable in said chamber, said plunger having a section of reduced diameter with lands at opposite ends dimensioned to sealingly engage with the walls of the chamber and spaced apart to maintain communication between said passages in all positions of the plunger, said section tapering progressively from one of said lands toward the other land to present a cam surface disposed at an angle to the axis of the chamber, a bushing fitted into one of the passages defining a valve seat around the passage, a ball element yieldably urged into sealing engagement with said seat to close the passage, and an elongated actuating element disposed in said passage between said ball element and the tapered section of said plunger, said one passage being inclined relative to the axis of said chamber at an angle such as to maintain said actuating element normal to said cam surface, said cam surface acting to push said actuating element in a direction effective to shift said ball element away from said seat to open the passage as said plunger is shifted to present the larger end of the tapered section for engagement by the actuating element.

2. A valve adapted to be connected in the main brake line of the hydraulic brake system of an automotive vehicle comprising, in combination, a housing defining a cylindrical chamber opening at both ends of the housing, said housing having ports opening into the chamber intermediate its ends, a plunger in said chamber shiftable between two limit positions and having a pair of lands sealingly engageable with the walls of the chamber, said lands being spaced apart to define a passage between said ports in all positions of the plunger, a cam surface formed on the portion of the plunger between said lands disposed at an angle to the axis of the chamber, a fitting mounted in one of said ports defining an elongated passage opening at one end into said chamber and having a valve seat at its other end, a movable valve member cooperating with said seat, spring means urging said valve member against the seat to close the passage against fluid flow in one direction, an elongated actuating element supported and guided for reciprocation in said passage with one end positioned to engage the cam surface on the plunger between said lands and the other end positioned to engage said valve member, said passage being disposed so as to maintain said actuating element normal to the cam surface of said plunger to minimize bending of said element when shifted by the plunger upon movement to one limit position and when shifted by said spring means upon movement of the plunger to the other limit position, said actuating element being formed with longitudinally disposed recesses to permit flow of fluid through said passage.

3. A valve comprising, in combination, a housing defining a cylindrical chamber with a pair of ports opening radially of the chamber, a plunger reciprocable axially in said chamber, said plunger having a section of reduced diameter with lands at opposite ends dimensioned to sealingly engage with the walls of the chamber and spaced apart to define a passage between said ports in all positions of the plunger, said section being tapered progressively from one toward the other of said lands, a check valve normally closing one of said ports, a valve actuating element coacting with said section of the plunger between said lands operative to open the check valve as the plunger is moved in one direction and to permit the check valve to close as the plunger is moved in the opposite direction, said valve actuating element being so disposed in the said port that the longitudinal axis of the valve actuating element is perpendicular to the tapered surface of the plunger in all positions of the plunger, and means for reciprocating the plunger in the cylindrical chamber.

References Cited in the file of this patent

UNITED STATES PATENTS

| | | |
|---|---|---|
| 12,136 | McCombs | July 28, 1903 |
| 992,375 | Moffit | May 16, 1911 |
| 1,672,394 | Sargent | June 5, 1928 |
| 1,858,164 | May | May 10, 1932 |
| 1,971,659 | Ruthven | Aug. 28, 1934 |
| 1,995,052 | Bodenlos | Mar. 19, 1935 |
| 2,208,220 | Malley | July 16, 1940 |
| 2,227,661 | Martinson | Jan. 7, 1941 |
| 2,258,798 | Patrick | Oct. 14, 1941 |
| 2,326,138 | Grant | Aug. 10, 1943 |
| 2,405,466 | Tabb | Aug. 6, 1946 |

FOREIGN PATENTS

| | | |
|---|---|---|
| 87,828 | Switzerland | of 1921 |